United States Patent
Kim

(10) Patent No.: US 10,612,572 B2
(45) Date of Patent: Apr. 7, 2020

(54) REGULATOR FOR CLUTCH OPERATING MECHANISM

(71) Applicants: HYUNDAI MOTOR COMPANY, Seoul (KR); KIA MOTORS CORPORATION, Seoul (KR)

(72) Inventor: Yonghee Kim, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 267 days.

(21) Appl. No.: 15/904,167

(22) Filed: Feb. 23, 2018

(65) Prior Publication Data

US 2019/0128295 A1 May 2, 2019

(30) Foreign Application Priority Data

Nov. 1, 2017 (KR) .................. 10-2017-0144437

(51) Int. Cl.
*F15B 21/00* (2006.01)
*B60K 23/02* (2006.01)
*F16L 55/04* (2006.01)
*F16D 48/02* (2006.01)

(52) U.S. Cl.
CPC ............ *F15B 21/008* (2013.01); *B60K 23/02* (2013.01); *F16L 55/041* (2013.01); *F16D 2048/0215* (2013.01); *F16D 2500/1026* (2013.01); *F16D 2500/10412* (2013.01); *F16D 2500/50293* (2013.01)

(58) Field of Classification Search
None
See application file for complete search history.

(56) References Cited

U.S. PATENT DOCUMENTS

| | | | | |
|---|---|---|---|---|
| 4,301,908 A * | 11/1981 | Fukuda | .................. | B60K 23/02 188/380 |
| 4,359,867 A * | 11/1982 | Swanson | .................. | F16D 25/14 267/117 |
| 5,135,091 A * | 8/1992 | Albers | .................... | F16D 48/04 192/83 |
| 6,234,290 B1 * | 5/2001 | Drexl | ..................... | B60K 23/02 192/85.51 |
| 6,745,886 B1 * | 6/2004 | Rey | ........................ | F16L 55/041 192/109 F |
| 6,973,850 B2 * | 12/2005 | Choi | ....................... | F16D 25/08 192/3.57 |
| 2010/0048340 A1 * | 2/2010 | Nakamura | .............. | F16D 48/02 475/129 |

* cited by examiner

*Primary Examiner* — Colby M Hansen
(74) *Attorney, Agent, or Firm* — Slater Matsil, LLP

(57) ABSTRACT

Disclosed is a regulator for clutch operating mechanism. The regulator includes a main body, a supply flow path for fluid flow from a master cylinder to an operating cylinder, and a return flow for fluid flow from the operating cylinder to the master cylinder inside of the main body. The regulator further includes a first valve installed inside the main body and configured to close an exit of the return flow path and open the supply flow path when the fluid flows to the operating cylinder and a second valve installed inside the main body configured to close an exit of the supply flow path and to open the return flow path when the fluid flows to the master cylinder. The regulator further includes a damping apparatus having a damping space which communicates with the supply flow path of the main body and whose internal capacity changes according to hydraulic pressure.

7 Claims, 8 Drawing Sheets

REGULATOR FOR CLUTCH OPERATING MECHANISM

CROSS-REFERENCE TO RELATED APPLICATION

This application claims the benefit of Korean Patent Application No. 10-2017-0144437, filed on Nov. 1, 2017 in the Korean Intellectual Property Office, the disclosure of which is incorporated herein by reference.

BACKGROUND

1. Field

Embodiments of the present disclosure relate to a regulator for clutch operating mechanism for reducing vibrations that are transferred to a clutch pedal.

2. Description of the Related Art

A clutch is installed between a transmission and an engine of a vehicle, and functions to transfer the torque of the engine to the transmission or prevent the torque of the engine from being transferring to the transmission.

Mechanism for operating the clutch includes a clutch pedal, a master cylinder, an operating cylinder, and an operating fork. In the clutch operating mechanism, when a driver puts on the clutch pedal, the hydraulic pressure of the master cylinder is transferred to the operating cylinder along a hydraulic line, and the operating cylinder operates the operating fork connected to the clutch to prevent power transfer by the clutch. In contrast, when the driver takes off the clutch pedal, the clutch pedal, the master cylinder, the operating cylinder, and the operating fork move in reverse order so as to connect power by the clutch.

In the clutch operating mechanism, the operating cylinder is installed in the transmission side of an engine room. Accordingly, vibrations generated from the engine and the transmission can be transferred to the clutch pedal in the indoor space of the vehicle through the hydraulic line of the clutch operating mechanism. However, the vibrations cause vibrations or noise of the clutch pedal. Therefore, various studies for preventing vibrations from being transferred to a clutch pedal through a hydraulic line are conducted.

The disclosure of this section is to provide background of the invention. Applicant notes that this section may contain information available before this application. However, by providing this section, Applicant does not admit that any information contained in this section constitutes prior art.

SUMMARY

Therefore, it is an aspect of the present disclosure to provide a regulator for clutch operating mechanism capable of reducing vibrations that are transferred to a clutch pedal through a hydraulic line.

Additional aspects of the disclosure will be set forth in part in the description which follows and, in part, will be obvious from the description, or may be learned by practice of the disclosure.

In accordance with one aspect of the present disclosure, a regulator for clutch operating mechanism includes a main body installed on a hydraulic line connecting a master cylinder to an operating cylinder, wherein a supply flow path to make fluid flow from the master cylinder to the operating cylinder, and a return flow path to make the fluid flow from the operating cylinder to the master cylinder are formed in the inside of the main body; a first valve installed in the inside of the main body, and configured to close an exit of the return flow path and to open the supply flow path when the fluid flows to the operating cylinder; a second valve installed in the inside of the main body, and configured to close an exit of the supply flow path and to open the return flow path when the fluid flows to the master cylinder; and a damping apparatus having a damping space which communicates with the supply flow path of the main body and whose internal capacity changes according to hydraulic pressure.

The supply flow path and the return flow path may be aligned in parallel with the same length, the first valve may be disposed at an entrance of the supply flow path and the exit of the return flow path, and the second valve may be disposed at the exit of the supply flow path and an entrance of the return flow path.

The first valve may include a first opening/closing portion configured to move forward or backward in the main body according to flow of the fluid to open or close the exit of the return flow path, and having a through hole to always open the entrance of the supply flow path, and a first pressing portion configured to move the first opening/closing portion in a direction of closing the exit of the return flow path, and the second valve may include a second opening/closing portion configured to move forward or backward in the main body according to flow of the fluid to open or close the exit of the supply flow path, and having a through hole to always open the entrance of the return flow path, and a second pressing portion configured to move the second opening/closing portion in a direction of closing the exit of the supply flow path.

The regulator for clutch operating mechanism may further include a first plug connecting the hydraulic line toward the master cylinder to the main body, and a second plug connecting the hydraulic line toward the operating cylinder to the main body.

The first pressing portion may include a first support ring supported on the first plug in the main body, and a plurality of first elastic supporting portions connecting the first support ring to the first opening/closing portion, and extending in a curved shape, and the second pressing portion comprises a second support ring supported on the second plug in the main body, and a plurality of second elastic supporting portions connecting the second support ring to the second opening/closing portion, and extending in a curved shape.

The damping apparatus may include a housing connected to the main body, and having the damping space therein; a cap configured to open or close an opening of the housing; a partition plate installed in the damping space, and configured to move forward or backward according to a change in hydraulic pressure; a sealing member whose circumference is interposed and fixed between the cap and an inner surface of the housing, an inner portion of the sealing member coupled with the partition plate to seal a circumference of the partition plate, wherein the sealing member is elastically deformed to allow movements of the partition plate; and an elastic member installed between the cap and the partition plate, and configured to support the partition plate.

The sealing member may include one or more sealing jaws formed in a circumference portion of the sealing member interposed between the cap and the housing, and configured to increase a sealing force.

BRIEF DESCRIPTION OF THE DRAWINGS

These and/or other aspects of the disclosure will become apparent and more readily appreciated from the following description of embodiments, taken in conjunction with the accompanying drawings of which:

FIG. 6 shows a state of when a driver does not put on the clutch pedal, FIG. 7 shows a state of when the driver puts on the clutch pedal, and FIG. 8 shows a state of when the driver puts on the clutch pedal and then takes off the clutch pedal.

DETAILED DESCRIPTION

Figure 1:
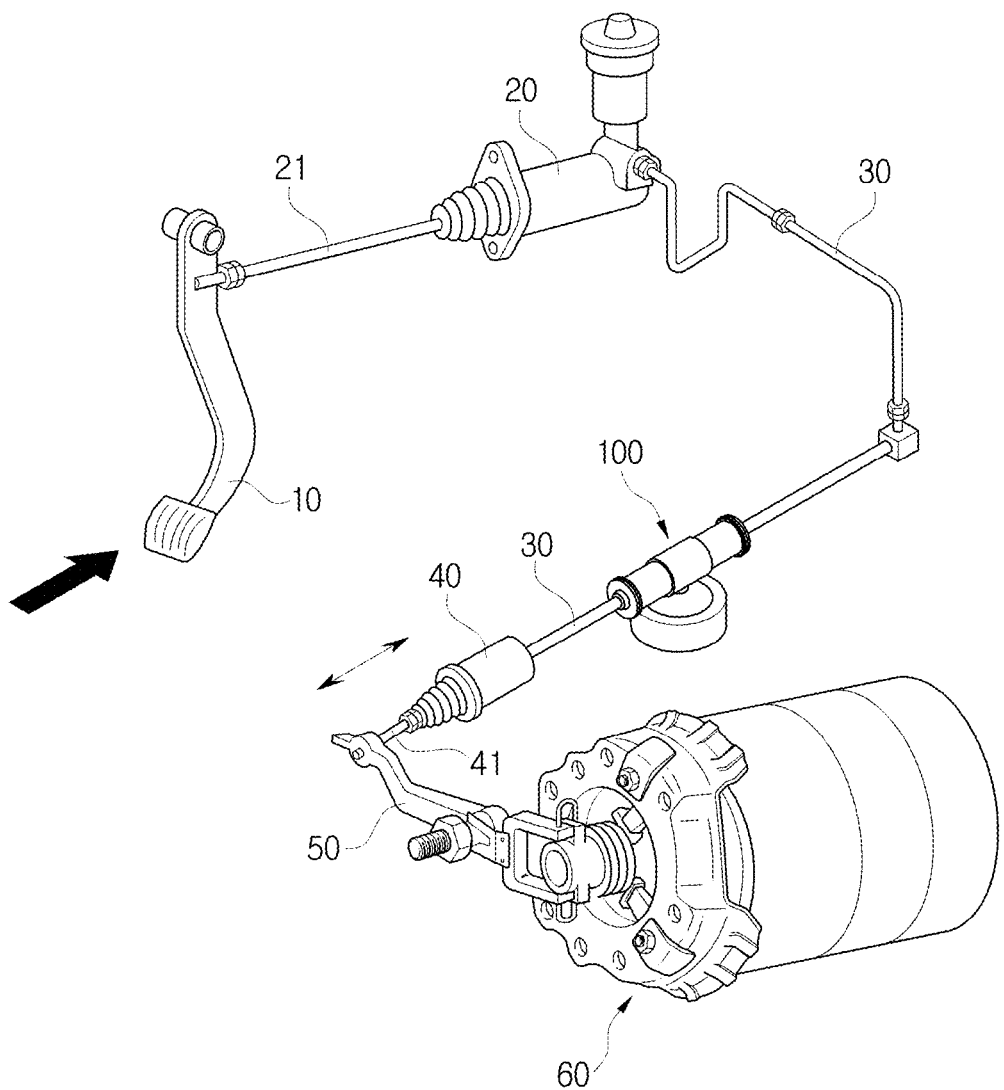
FIG. 1 is a perspective view showing a clutch operating mechanism to which a regulator according to an embodiment of the present disclosure is applied.

Hereinafter, embodiments of the present disclosure will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be in order to clarify the present disclosure, and also, for easy understanding, the sizes of components are more or less exaggeratedly shown.

An aspect of the present invention discloses a fluid regulator 100 for controlling vibration in a clutch system of a vehicle. The regulator is installed on a fluid path 30 connecting a master cylinder 20 of a clutch pedal 10 and an operation cylinder. The regulator 100 comprises a first fluid channel 111 and a second flow channel 112 extending between two valve chambers 120, 130. A partition 170 extending between the two valve chambers 120, 130 separates the two fluid channels 111 and 112.

Figure 6:
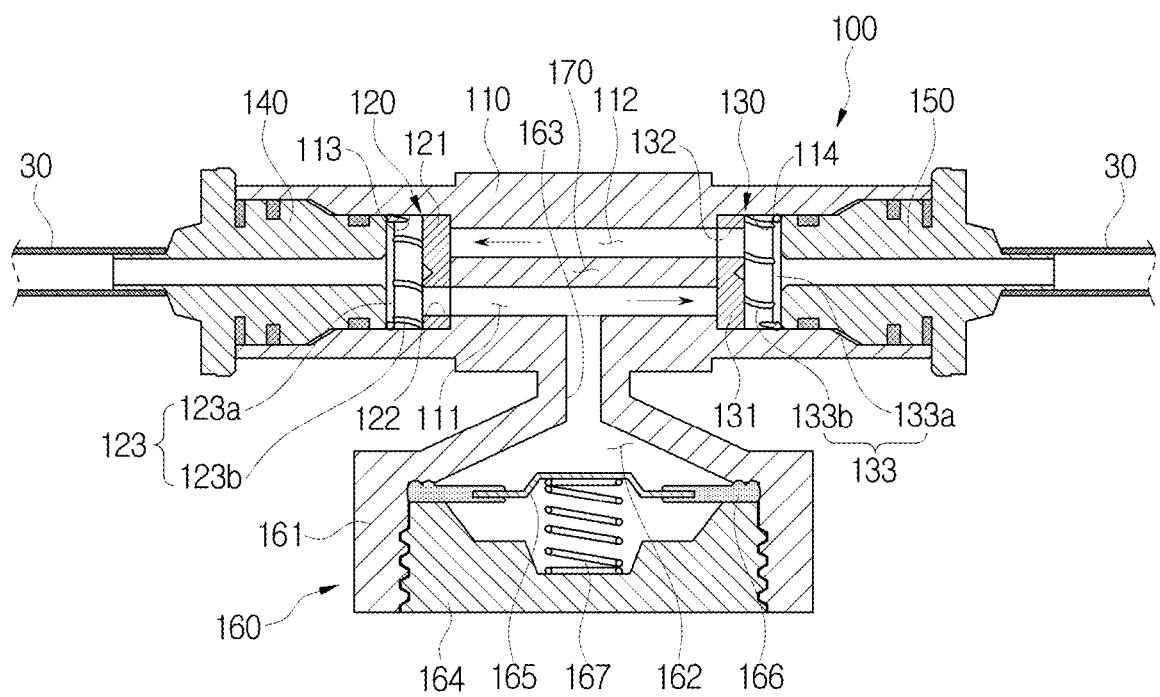
FIGS. 6 to 8 are cross-sectional view showing a fluid flow of the regulator for the clutch operating mechanism, according to an embodiment of the present disclosure.
Figure 7:
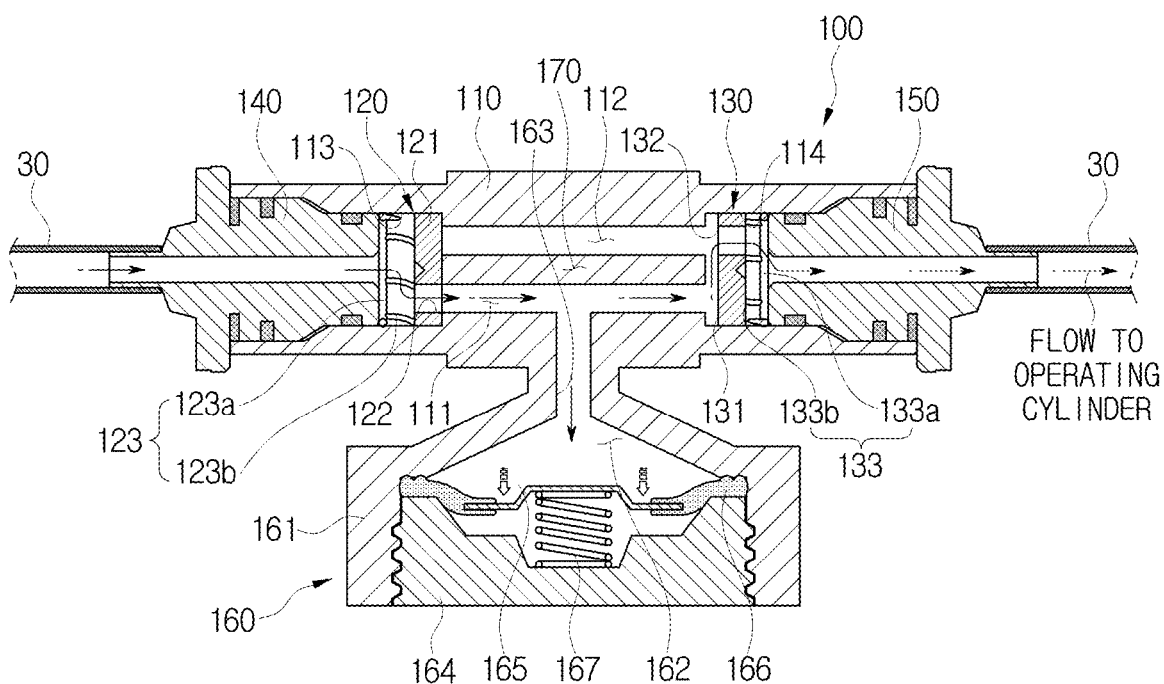
Figure 8:
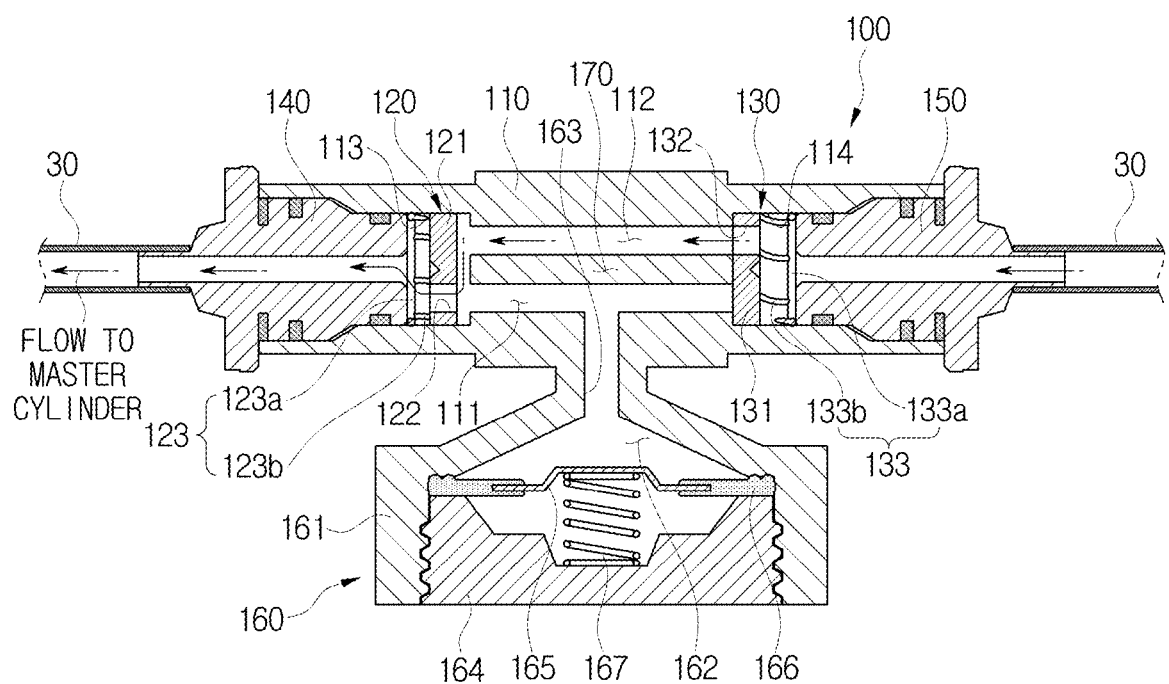

FIGS. 6-8 shows a sequence of the regulator's operation. In FIG. 6, when the vehicle is driving with no input on the clutch pedal, a first stopper 131 contacts one end (master cylinder side) of partition 170 to close one end of the fluid channel 111 and a second stopper 121 contacts the other end of the partition 170 to closes one end of the second channel 112. In FIG. 6, fluid communication between the master cylinder 20 and the operation cylinder 40 via the fluid path 30 is disconnected.

Subsequently, in response to a pedal input of the driver, as illustrated in FIG. 7, fluid supplied from master cylinder 20 pushes first stopper 131 inside first valve chamber 130 away from partition 170 to open two ends of first fluid channel 111. Second stopper 121 is pushed toward partition 170 to keep second fluid channel 112 closed. While fluid is supplied to the operation cylinder 40 via first fluid channel 111, at least part of fluid from master cylinder 20 flows into vibration damping space 162 that is directly connected to the first fluid channel 111.

Subsequently, when the pedal input disappears as the driver takes his foot off the clutch pedal, as illustrated in FIG. 8, fluid returning from the operation cylinder pushes the second stopper 121 away from the partition 170 inside the second valve chamber 120 to open two ends of second fluid channel 112. The first stopper 131 is now pushed back toward the partition 170 to close one end of the first fluid channel 111. The second fluid channel is not directly connected to the damping space 162 such that fluid flows back to the master cylinder 20 via second fluid channel 112 with less vibration damping (when compared to supplying fluid to the operation cylinder 40).

The regulator 100 is configured to open or close the fluid channels 111, 112 passively by fluid flow using the stoppers 121, 131 movable inside the valve chamber without using an external power to drive a valve.

FIG. 1 is a perspective view showing clutch operating mechanism to which a regulator according to an embodiment of the present disclosure is applied. As shown in FIG. 1, the clutch operating mechanism may include a clutch pedal 10, a master cylinder 20, a hydraulic line 30, an operating cylinder 40, an operating fork 50, and a regulator 100.

The clutch pedal 10 may be installed in the inside space of a vehicle, and the master cylinder 20 may be connected to the clutch pedal 10 by a push rod 21 and installed in an engine room of the vehicle. The master cylinder 20 may generate hydraulic pressure for operating a clutch 60 when a driver puts on the clutch pedal 10.

The clutch 60 may be installed between an engine of the vehicle and a transmission, and may connect or block power that is transferred from the engine to the transmission by operation of the operating fork 50. One end of the operating fork 50 may extend from the outer side of the clutch 60, and the operating cylinder 40 may be connected to the operating fork 50 by a push rod 41 and installed in the transmission side.

The master cylinder 20 may be connected to the operating cylinder 40 by the hydraulic line 30 in the shape of a pipe. Accordingly, in the clutch operating mechanism, when a driver puts on the clutch pedal 10, hydraulic pressure of the master cylinder 20 may be transferred to the operating cylinder 40 along the hydraulic line 30, and the operating cylinder 40 may operate the operating fork 50 to prevent power transfer by the clutch 40. In contrast, when the driver takes off the clutch pedal 10, the clutch pedal 10, the master cylinder 20, the operating cylinder 40, and the operating fork 50 may move in reverse order so that power is connected by the clutch 60.

Herein, the operating cylinder 40 may be a Clutch Release Cylinder (CRC) that receives hydraulic pressure of the master cylinder 20 to operate the operating fork 50, although not limited thereto. Alternatively, the operating cylinder 40 of the clutch operating mechanism may be a hydraulic cylinder of a Concentric Slave Cylinder (CSC) assembly type.

The regulator 100 may be installed on the hydraulic line 300 connecting the master cylinder 20 to the operating cylinder 40, to reduce vibrations that are transferred from the engine, the transmission, etc. to the clutch pedal 10 through the hydraulic line 30.

Figure 2:
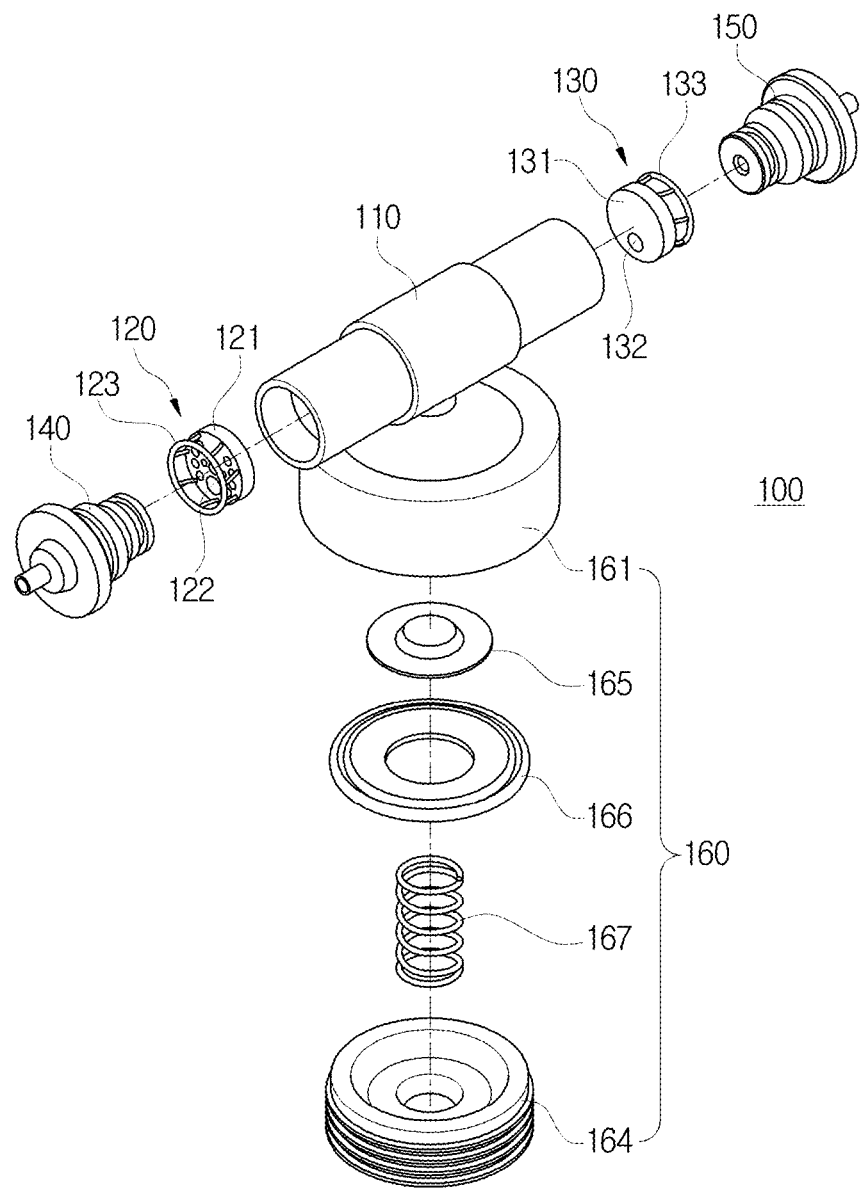
FIG. 2 is an exploded perspective view of a regulator for the clutch operating mechanism, according to an embodiment of the present disclosure.
Figure 3:
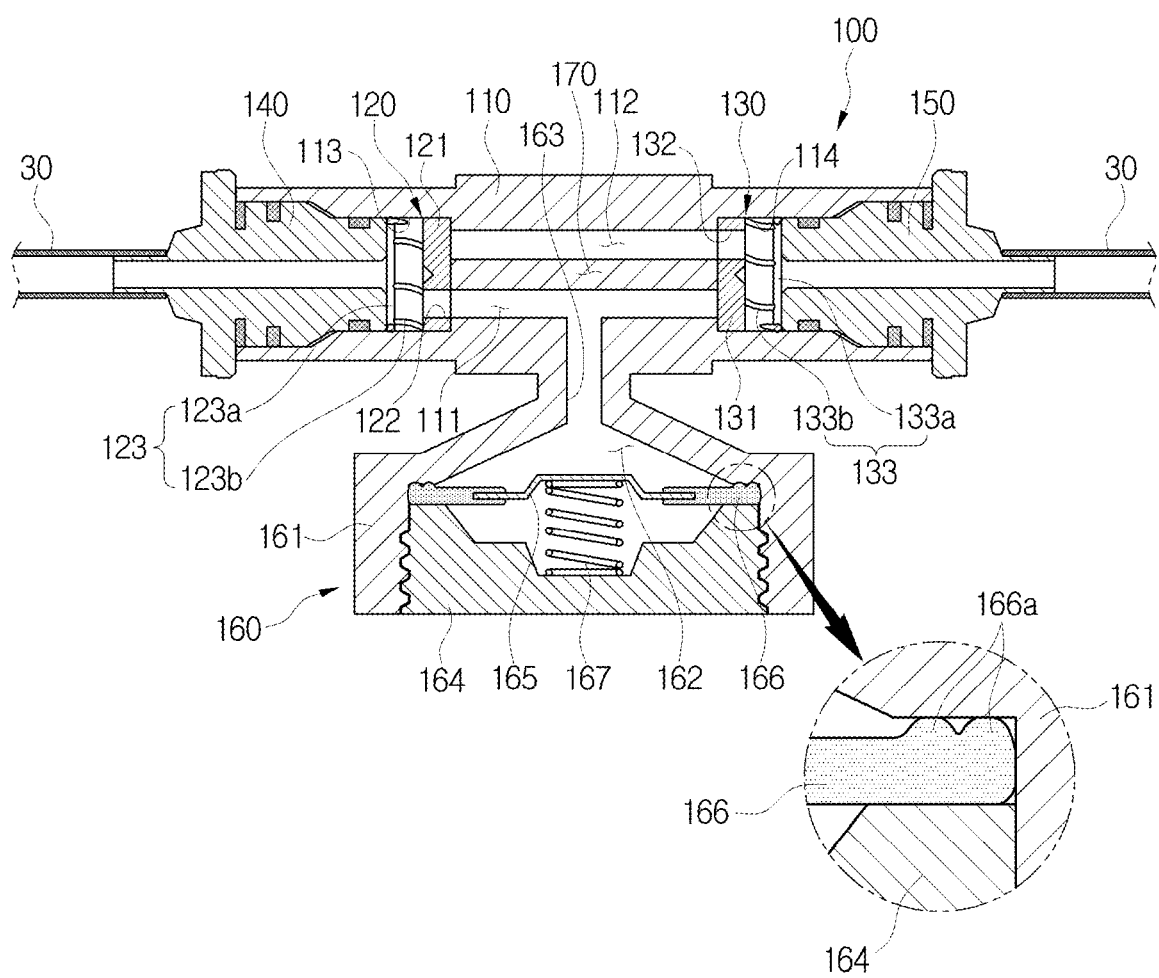
FIG. 3 is a cross-sectional view of a regulator for the clutch operating mechanism, according to an embodiment of the present disclosure.

FIG. 2 is an exploded perspective view of a regulator according to an embodiment of the present disclosure, and FIG. 3 is a cross-sectional view of the regulator.

Referring to FIGS. 2 and 3, the regulator 100 may include a main body 110, a first valve 120, a second valve 130, a first plug 140, a second plug 150, and a damping apparatus 160.

The main body 110 may be in the shape of a pipe whose both ends open, and include a flow path to accommodate the hydraulic line 30 therein. One end of the main body 110 may be coupled with the first plug 140 for connecting to the hydraulic line 30 extending from the master cylinder 20, and the other end of the main body 110 may be coupled with the second plug 150 for connecting to the hydraulic line 30 extending from the operating cylinder 40. The first plug 140 and the second plug 150 may be screw-coupled with both ends of the main body 110 with packings in between so as to seal the both ends of the main body 110.

In the main body 110, a supply flow path 111 to make fluid flow from the master cylinder 20 to the operating cylinder 40, and a return flow path 112 to make fluid flow from the operating cylinder 40 to the master cylinder 20 may be formed. The supply flow path 111 and the return flow path 112 may extend with the same length in the longitudinal direction of the main body 110 such that fluid from the hydraulic line 30 can flow continuously, and the supply flow path 111 and the return flow path 112 may be aligned in parallel.

At both ends of the supply flow path 111 and the return flow path 112 in the main body 110, a first valve accommodating space 113 to accommodate the first valve 120, and a second valve accommodating space 114 to accommodate the second valve 130 may be provided, wherein the first valve accommodating space 113 and the second valve accommodating space 114 are in the shape of a cylinder. That is, the first valve 120 may be installed in the first valve accommodating space 113 formed at an entrance of the supply flow path 111 and an exit of the return flow path 112, and the second valve 130 may be installed in the second valve accommodating space 114 formed at an exit of the supply flow path 111 and an entrance of the return flow path 112.

Figure 4:
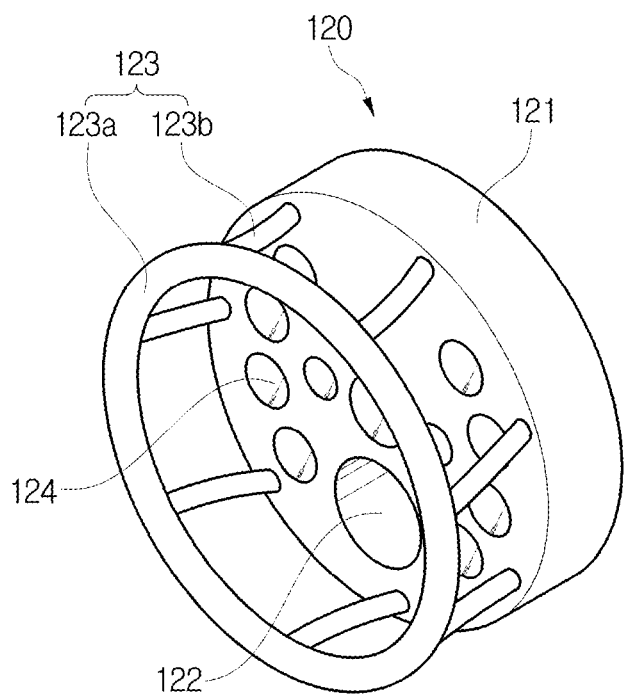
FIG. 4 is a perspective view of a first valve of the regulator for the clutch operating mechanism, according to an embodiment of the present disclosure.
Figure 5:
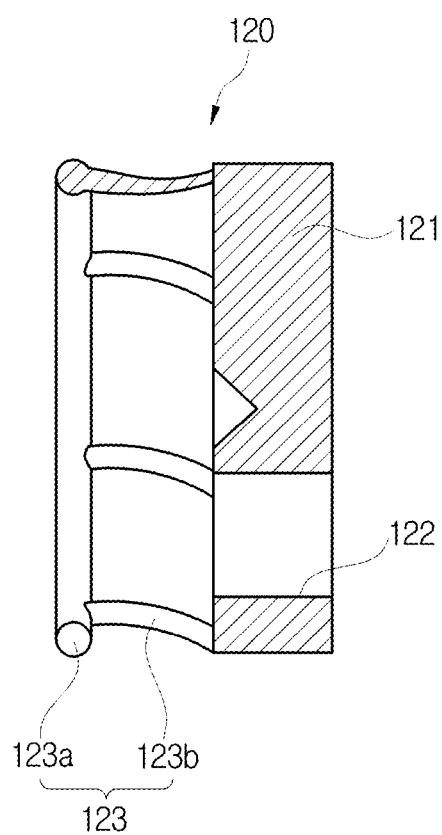
FIG. 5 is a cross-sectional view of a first valve of the regulator for the clutch operating mechanism, according to an embodiment of the present disclosure.

The first valve 120 may move forward or backward in the first valve accommodating space 113 along flow of fluid, as shown in FIGS. 3, 4, and 5, to open or close the exit of the return flow path 112. The first valve 120 may include a first opening/closing portion 121 formed in the shape of a disk and having a through hole 122 to always open the entrance of the supply flow path 111, and a first pressing portion 123 to move the first opening/closing portion 121 in a direction of closing the exit of the return flow path 112. The first pressing portion 123 may include a first support ring 123a supported on the first plug 140 in the first valve accommodating space 113, and a plurality of first elastic supporting portions 123b connecting the first support ring 123a to the first opening/closing portion 121. The plurality of first elastic supporting portions 123b may extend in a curved shape to be easily bent in order to move the first opening/closing portion 121 forward or backward.

The first valve 120 may cause, when fluid flows from the master cylinder 20 to the operating cylinder 40, the first opening/closing portion 121 to close the exit of the return flow path 112 and to open the entrance of the supply flow path 111, so that the fluid is supplied to the operating cylinder 40 through the supply flow path 111, as shown in FIG. 7.

The first opening/closing portion 121, the first support ring 123a, and the first elastic support portions 123b of the first valve 120 may be molded into one body by an elastic material, such as rubber or silicon. Also, in the rear surface of the first opening/closing portion 121, a plurality of grooves 124 may be formed to absorb vibrations of fluid, like an example shown in FIG. 4.

The second valve 130 may move forward or backward in the second valve accommodating space 114 along flow of fluid to open or close the exit of the supply flow path 111.

The second valve 130 may include a second opening/closing portion 131 formed in the shape of a disk and having a through hole 132 to always open the entrance of the return flow path 112, and a second pressing portion 133 to move the second opening/closing portion 131 in a direction of closing the exit of the supply flow path 111. The second pressing portion 133 may include a second support ring 133a supported on the second plug 150 in the second valve accommodating space 114, and a plurality of second elastic supporting portions 133b connecting the second support ring 133a to the second opening/closing portion 131. The plurality of second elastic supporting portions 133b may extend in a curved shape to be easily bent in order to move the second opening/closing portion 131 forward or backward. Like the first valve 120, the second opening/closing portion 131, the second support ring 133a, and the second elastic support portion 133b of the second valve 130 may be molded into one body by an elastic material, such as rubber or silicon. Also, in the rear surface of the second opening/closing portion 130, a plurality of grooves may be formed to absorb vibrations of fluid.

The second valve 130 may cause, when fluid flows from the operating cylinder 40 to the master cylinder 20, the second opening/closing portion 131 to close the exit of the supply flow path 111 and to open the entrance of the return flow path 112, so that the fluid returns to the master cylinder 20 through the return flow path 112, as shown in FIG. 8.

Referring to FIGS. 2 and 3, the damping apparatus 160 may include a housing 161, a cap 164, a partition plate 165, a sealing member 166, and an elastic member 167.

The housing 161 may be in the shape of a cylinder whose bottom opens, and the upper portion of the housing 161 may be connected to the main body 110. The housing 161 may be integrated into the main body 110. In a connection portion between the main body 110 and the housing 161, a connection flow path 163 may be formed to communicate a damping space 162 with the supply flow path 111.

The cap 164 may be screw-coupled with the lower open portion of the housing 161 to seal the lower area of the damping space 162.

The partition plate 165 may be in the shape of a disc whose outside diameter is smaller than the inside diameter of the housing 161, such that the partition plate 165 can rise and fall in the damping space 162 inside the housing 161.

The sealing member 166 may be in the shape of a ring made of a rubber material that can be elastically deformed, and the circumference portion of the sealing member 166 may be interposed and fixed between the cap 164 and the housing 161 to seal a part of the cap 164 coupled with the housing 161. In the circumference portion of the sealing member 166 interposed between the cap 164 and the housing 161, one or more sealing jaws 166a for increasing a sealing force may be formed, as shown in FIG. 3. The sealing jaws 166a may be formed along the circumference of the sealing member 166, and pressed into the inner surface of the housing 161 by elastic deformation so as to prevent fluid from leaking out.

Also, the sealing member 166 may be coupled with the partition plate 165 such that the inner portion of the sealing member 166 seals the circumference of the partition plate 165. The sealing member 166 may be elastically deformed to allow movements of the partition plate 165. Accordingly, if hydraulic pressure of the damping space 162 changes, the position of the partition plate 165 may change so that an internal capacity of the damping space 162 may change.

The elastic member 167 may be a compression coil spring installed in a space between the cap 164 and the partition plate 165 to support the partition plate 165. When hydraulic pressure of the damping space 162 increases, the elastic member 167 may be pushed by the partition plate 165 and contracted, and when hydraulic pressure of the damping space 162 decreases, the elastic member 167 may extend to return the partition plate 165 to its original position.

Since the capacity of the damping space 162 can change according to a change in hydraulic pressure applied to the supply flow path 111, the damping apparatus 160 can absorb vibrations that are transferred from the transmission to the clutch pedal 10 through the fluid line 30 when the driver puts on the clutch pedal 10, thereby reducing the vibrations.

Now, operations of the regulator for the clutch operating mechanism according to an embodiment of the present disclosure will be described with reference to FIGS. 6 to 8. FIG. 6 shows a state of when a driver does not put on the clutch pedal, FIG. 7 shows a state of when the driver puts on the clutch pedal, and FIG. 8 shows a state of when the driver puts on the clutch pedal and then takes off the clutch pedal.

As shown in FIG. 6, when a driver does not put on the clutch pedal 10, no substantial flow of fluid may take place in the regulator 100, and accordingly, in the first valve 120, the first opening/closing portion 121 may move to the exit of the return flow path 112 to close the exit of the return flow path 112. Since the through hole 122 of the first opening/closing portion 121 corresponds to the entrance of the supply flow path 111, the entrance of the supply flow path 111 may open. In the second valve 130, the second opening/closing portion 131 may move to the exit of the supply flow path 111 to close the exit of the supply flow path 111. Since the through hole 132 of the second opening/closing portion 131 corresponds to the entrance of the return flow path 112, the entrance of the return flow path 112 may open.

As shown in FIG. 7, if the driver puts on the clutch pedal 10 so that fluid flows from the master cylinder 20 to the operating cylinder 40, fluid entered the supply flow path 111 may push the second opening/closing portion 131 of the second valve 130 to open the exit of the supply flow path 111. Accordingly, the hydraulic line 130 may communicate with the supply flow path 111 through the through hole 132 of the second opening/closing portion 131. That is, the fluid may be supplied to the operating cylinder 40 through the supply flow path 111 and the through hole 132 of the second opening/closing portion 131.

If the driver puts on the clutch pedal 10 so that hydraulic pressure is supplied to the operating cylinder 40, vibrations from the engine, the transmission, etc. may be transferred through the hydraulic line 30. If the vibrations reach the supply flow path 111 of the regulator 100, the vibrations may be attenuated by the damping apparatus 160 and cancelled. That is, the vibrations may be attenuated while causing a change in capacity of the damping space 162 in the damping apparatus 160 to thereby be prevented from being transferred to the clutch pedal 10.

As shown in FIG. 8, when the driver takes off the clutch pedal 10, the fluid supplied to the operating cylinder 40 may flow to the master cylinder 20 through the hydraulic line 30. At this time, the exit of the supply flow path 111 may be closed by the second opening/closing portion 131 of the second valve 130, and the fluid returned through the return flow path 112 may push the first opening/closing portion 121 of the first valve 120 to open the exit of the return flow path 112. Accordingly, the fluid may return to the master cylinder 20 through the return flow path 112 and the through hole 122 of the first opening/closing portion 121.

Since the fluid quickly returns to the master cylinder 20 through the return flow path 112, not via the damping apparatus 160, the clutch pedal 10 can quickly return to its original position. As such, when the driver takes off the clutch pedal 10 so that the fluid returns, the hydraulic pressure of the hydraulic line 30 may be reduced, and accordingly, vibration transfer through the hydraulic line 30 may be insignificant.

As such, in the regulator 100 for the clutch operating mechanism according to an embodiment of the present disclosure, since the damping apparatus 160 attenuates vibrations that are transferred from the engine, the transmission, etc. through the hydraulic line 30 when a driver puts on the clutch pedal 10, vibrations transferred to the clutch pedal 10 can be reduced.

Also, in the regulator 100 for the clutch operating mechanism according to an embodiment of the present disclosure, since fluid quickly returns to the master cylinder 20 through the return flow path 112, not via the damping apparatus 160, when a driver puts on the clutch pedal 10 and then takes off the clutch pedal 10, the clutch pedal 10 can quickly return to its original position.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A regulator for clutch operating mechanism, comprising:
   a main body installed on a hydraulic line connecting a master cylinder to an operating cylinder, wherein a supply flow path to make fluid flow from the master cylinder to the operating cylinder, and a return flow path to make the fluid flow from the operating cylinder to the master cylinder are formed in the inside of the main body;
   a first valve installed in the inside of the main body, and configured to close an exit of the return flow path and to open the supply flow path when the fluid flows to the operating cylinder;
   a second valve installed in the inside of the main body, and configured to close an exit of the supply flow path and to open the return flow path when the fluid flows to the master cylinder; and
   a damping apparatus having a damping space which communicates with the supply flow path of the main body and whose internal capacity changes according to hydraulic pressure.

2. The regulator for clutch operating mechanism according to claim 1, wherein the supply flow path and the return flow path are aligned in parallel with the same length,
   the first valve is disposed at an entrance of the supply flow path and the exit of the return flow path, and
   the second valve is disposed at the exit of the supply flow path and an entrance of the return flow path.

3. The regulator for clutch operating mechanism according to claim 1, wherein the first valve comprises a first opening/closing portion configured to move forward or backward in the main body according to flow of the fluid to open or close the exit of the return flow path, and having a through hole to always open the entrance of the supply flow path, and a first pressing portion configured to move the first opening/closing portion in a direction of closing the exit of the return flow path, and
   the second valve comprises a second opening/closing portion configured to move forward or backward in the main body according to flow of the fluid to open or close the exit of the supply flow path, and having a through hole to always open the entrance of the return flow path, and a second pressing portion configured to move the second opening/closing portion in a direction of closing the exit of the supply flow path.

4. The regulator for clutch operating mechanism according to claim 3, further comprising a first plug connecting the hydraulic line toward the master cylinder to the main body, and a second plug connecting the hydraulic line toward the operating cylinder to the main body.

5. The regulator for clutch operating mechanism according to claim 4, wherein the first pressing portion comprises a first support ring supported on the first plug in the main body, and a plurality of first elastic supporting portions connecting the first support ring to the first opening/closing portion, and extending in a curved shape, and the second pressing portion comprises a second support ring supported on the second plug in the main body, and a plurality of second elastic supporting portions connecting the second support ring to the second opening/closing portion, and extending in a curved shape.

6. The regulator for clutch operating mechanism according to claim 1, wherein the damping apparatus comprises:

a housing connected to the main body, and having the damping space therein;

a cap configured to open or close an opening of the housing;

a partition plate installed in the damping space, and configured to move forward or backward according to a change in hydraulic pressure;

a sealing member whose circumference is interposed and fixed between the cap and an inner surface of the housing, an inner portion of the sealing member coupled with the partition plate to seal a circumference of the partition plate, wherein the sealing member is elastically deformed to allow movements of the partition plate; and an elastic member installed between the cap and the partition plate, and configured to support the partition plate.

7. The regulator for clutch operating mechanism according to claim 6, wherein the sealing member comprises one or more sealing jaws formed in a circumference portion of the sealing member interposed between the cap and the housing, and configured to increase a sealing force.

\* \* \* \* \*